May 20, 1958     T. FREDRIKSSON     2,835,717

STIRRING WINDING SYSTEM FOR METALLURGICAL FURNACES

Filed Jan. 31, 1957

INVENTOR.
Tord Fredriksson

BY
Attorney.

United States Patent Office 2,835,717
Patented May 20, 1958

2,835,717

STIRRING WINDING SYSTEM FOR METAL-LURGICAL FURNACES

Tord Fredriksson, Vasteras, Sweden, assignor to Allmänna Svenska Elektriska Aktiebolaget, Vasteras, Sweden, a corporation of Sweden Application January 31, 1957, Serial No. 637,535

Claims priority, application Sweden February 2, 1956

3 Claims. (Cl. 13—26)

Stirring windings which work according to the asynchronous motor principle, for melting furnaces now usually have substantially cylindric coils, slid on to straight or curved iron yokes. These stirring means have some advantages as compared with stirring windings of the pancake type, embedded in slots of an iron yoke. Measures may however be taken to minimize the reactive power of the winding. The field emerging from the lower side and from both sides of the winding does not contribute to the stirring forces, but increases the reactive power. The present invention solves the task of minimizing the said reactive power in that, between the lower surface of the iron yoke and the adjacent surface of the winding, as well as between the side surfaces of the yoke and the adjacent surfaces of the winding, there are embedded damping means of non-magnetic material having a low ohmic resistivity such as copper or aluminum. Within said damping means there are induced eddy currents which minimize the idle part of the magnetic flux with the consequence that the reactive power is minimized.

Due to the fact that the flux is reduced the damping means make it further possible to minimize the height of the iron yoke and consequently its cross-section and weight. For carrying away the heat, cooling tubes or cooling channels may be arranged which are in direct contact with the iron yoke as well as with the damping means.

The invention is described by means of an example which is shown on the accompanying drawing.

Figure 1:
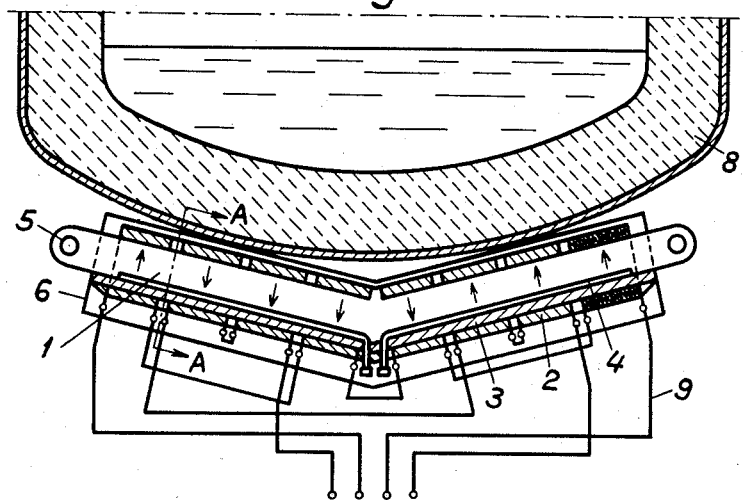
Figure 2:
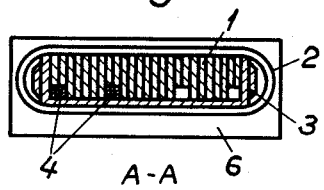
Figure 3:
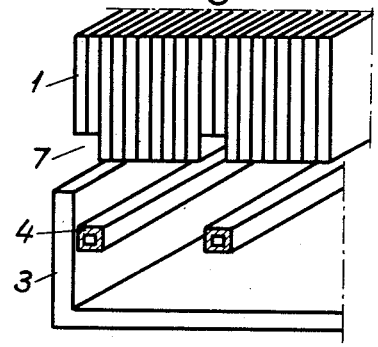
Figure 4:
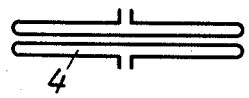

Figure 1 shows a longitudinal section through a stirring system, Figure 2, a section along the line A—A in Figure 1, and Figure 3 is a detail perspective view showing parts of the structure before assembly, and Figure 4 is a detail view showing a modified form of the cooling tubes.

A coarsely laminated iron yoke 1, arranged substantially below the charge container 8, is surrounded by coils 2, fed symmetrically by poly-phase current as illustrated by the leads 9 in Figure 1. Between the lower surface of the yoke and the surface of the winding facing it and between the side surfaces of the yoke and adjacent surfaces of the winding, according to the invention, a damping means 3 of non-magnetic material of low ohmic resistivity, is placed, which may consist of an integral trough. Cooling tubes 4 are laid into grooves 7 which are built by iron laminae, which are narrower than the remaining laminae of the yoke. It is also possible to let the grooves themselves, brought about in this manner, form cooling channels which are joined with connection means for the cooling medium. 5 are supporting lugs for the stirring system and extend from some iron laminae and a protection cap is designated by 6. The stirring winding itself may be hollow for internal cooling. Although it is advantageous to combine the damping means with the cooling means, as shown on the drawing, it is conceivable to provide the stirring means with the former means only.

The cooling means are clearly illustrated in Figure 3 which shows, in perspective, the iron yoke 1, two cooling tubes 4 and a portion of the damping means 3 before these parts are assembled. Some of the laminae are narrower than the others so that grooves 7 are formed for the reception of the tubes 4 and one example of an embodiment of the cooling tubes is shown in Figure 4, and in this case the cooling medium is preferably a fluid, for example water.

When the cooling tubes 4 are omitted as shown, for example, in the right hand half of Figure 2 the cooling medium may be air.

I claim as my invention:

1. A polyphase stirring winding system for stirring the metallic charge in a container for molten metal, comprising a coarsely laminated magnetic yoke arranged substantially below the bottom of the container and substantially cylindric coils slid upon said magnetic yoke and supplied with poly-phase currents, damping means of non-magnetic material of low ohmic resistivity for minimizing the reactive power of the winding, said damping means being inserted between the lower surface of the yoke and the surface of the winding facing said lower surface as well as between the side surfaces of the yoke and the adjacent surfaces of the winding, and cooling means arranged in contact with the said damping means and said yoke.

2. A polyphase stirring winding system for stirring the metallic charge in a container for molten metal, comprising a coarsely laminated magnetic yoke arranged substantially below the bottom of the container and substantially cylindric coils slid upon said magnetic yoke and supplied with poly-phase currents, damping means of non-magnetic material of low ohmic resistivity for minimizing the reactive power of the winding, said damping means being inserted in the shape of a trough between the lower surface of the yoke and the surface of the winding facing said lower surface, as well as between the side surfaces of the yoke and the adjacent surfaces of the winding, and cooling channels within the yoke in contact with said damping means.

3. A polyphase stirring winding system for stirring the metallic charge in a container for molten metal, comprising a coarsely laminated magnetic yoke arranged substantially below the bottom of the container and substantially cylindric coils slid upon said magnetic yoke and supplied with poly-phase currents, damping means of non-magnetic material of low ohmic resistivity for minimizing the reactive power of the winding, said damping means being inserted in the shape of a trough and consisting of lower and side portions between the lower surface of the yoke and the surface of the winding facing said lower surface as well as between the side surfaces of the yoke and the adjacent surfaces of the winding and cooling conduits inserted within the said yoke and in contact with the damping means.

References Cited in the file of this patent

UNITED STATES PATENTS

| 2,620,366 | Ladell | Dec. 2, 1952 |
| 2,652,411 | Gynt et al. | Sept. 15, 1953 |
| 2,759,035 | Dreyfus | Aug. 14, 1956 |